United States Patent
Gallet

(10) Patent No.: US 10,435,163 B2
(45) Date of Patent: Oct. 8, 2019

(54) AIRCRAFT PROPELLED BY A TURBOJET ENGINE WITH CONTRAROTATING FANS

(71) Applicant: SNECMA, Paris (FR)

(72) Inventor: François Gallet, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 14/439,329

(22) PCT Filed: Oct. 29, 2013

(86) PCT No.: PCT/FR2013/052583
§ 371 (c)(1),
(2) Date: Apr. 29, 2015

(87) PCT Pub. No.: WO2014/072615
PCT Pub. Date: May 15, 2014

(65) Prior Publication Data
US 2015/0291285 A1    Oct. 15, 2015

(30) Foreign Application Priority Data
Nov. 8, 2012  (FR) ..................................... 12 60597

(51) Int. Cl.
*B64D 27/20* (2006.01)
*B64D 27/14* (2006.01)
(Continued)

(52) U.S. Cl.
CPC ............. *B64D 27/20* (2013.01); *B64D 27/14* (2013.01); *B64D 33/02* (2013.01); *F01D 13/02* (2013.01);
(Continued)

(58) Field of Classification Search
CPC ...... F01D 13/003; F01D 13/006; F01D 13/02; F02C 6/02; B64D 27/20; B64D 27/14;
(Continued)

(56) References Cited

U.S. PATENT DOCUMENTS 2,504,422 A * 4/1950 Hawkins, Jr. ............. B64C 1/00
244/120
2,571,586 A * 10/1951 Lane ....................... B64D 27/02
244/57
(Continued)

FOREIGN PATENT DOCUMENTS

DE     1506089 A1 *  7/1969  ........... B64C 31/024
DE     2119288 A1 * 11/1972  ............. B64D 27/02
(Continued)

OTHER PUBLICATIONS

Fischer, English Machine Translation or DE 1506089, translated by EPO on Aug. 29, 2016.*
(Continued)

*Primary Examiner* — David E Sosnowski
*Assistant Examiner* — Wayne A Lambert
(74) *Attorney, Agent, or Firm* — Pillsbury Winthrop Shaw Pittman LLP

(57) ABSTRACT

An aircraft propelled by a turbojet having contrarotating fans, the turbojet being incorporated at the rear of a fuselage of the aircraft and in line therewith and including two gas generators that feed a working turbine having two contrarotating turbine rotors for driving two fans arranged downstream from the gas generators, and distinct air intakes for feeding each gas generator, the air intakes being connected to the fuselage of the aircraft so as to take in at least a portion of the boundary layer formed around the fuselage of the aircraft.

5 Claims, 1 Drawing Sheet

(51) Int. Cl.
 B64D 33/02 (2006.01)
 F02C 6/02 (2006.01)
 F01D 13/02 (2006.01)
 B64D 27/00 (2006.01)

(52) U.S. Cl.
 CPC .......... F02C 6/02 (2013.01); *B64D 2027/005* (2013.01); *B64D 2033/0273* (2013.01); *B64D 2033/0286* (2013.01); *Y02T 50/44* (2013.01); *Y02T 50/66* (2013.01); *Y02T 50/671* (2013.01)

(58) Field of Classification Search
 CPC .............. B64D 2027/005; B64D 29/04; B64D 2033/0286; B64D 2033/0273; B64D 2033/0293; Y02T 50/44; Y02T 50/671; Y02T 50/66
 See application file for complete search history.

(56) References Cited

U.S. PATENT DOCUMENTS

| | | | | |
|---|---|---|---|---|
| 2,812,912 A * | 11/1957 | Stevens | B64D 27/20 244/52 |
| 2,907,536 A * | 10/1959 | von Zborowski | B64C 29/0091 244/12.1 |
| 2,918,229 A * | 12/1959 | Lippisch | B64C 39/062 244/15 |
| 2,971,724 A * | 2/1961 | von Zborowski | B64C 29/02 244/12.1 |
| 3,041,016 A * | 6/1962 | Heath | B64C 25/10 244/54 |
| 3,060,685 A * | 10/1962 | Tonnies | B64D 27/20 244/110 B |
| 3,099,425 A * | 7/1963 | Fricke | B64D 27/20 244/74 |
| 3,107,883 A * | 10/1963 | Haberkorn | B64D 27/20 244/15 |
| 3,109,610 A * | 11/1963 | Quenzler | F02C 7/05 244/15 |
| 3,113,636 A * | 12/1963 | Brown | B64D 27/20 181/220 |
| 3,117,748 A * | 1/1964 | Gerlaugh | B64C 29/0016 244/15 |
| 3,153,907 A * | 10/1964 | Griffith | B64C 29/005 244/55 |
| 3,194,516 A * | 7/1965 | Messerschmitt | B64D 27/20 244/74 |
| 3,286,470 A * | 11/1966 | Gerlaugh | B64D 27/20 244/15 |
| 3,289,975 A * | 12/1966 | Hall | B64C 29/0066 244/12.5 |
| 3,327,476 A * | 6/1967 | Rizk | F01D 9/06 60/797 |
| 3,489,377 A * | 1/1970 | Wright | F02C 7/045 137/15.1 |
| 3,563,500 A * | 2/1971 | Fischer | B64C 31/024 244/16 |
| 3,576,300 A * | 4/1971 | Palfreyman | B64D 27/20 244/1 N |
| 3,582,022 A * | 6/1971 | Robinson | B64C 27/26 244/15 |
| 3,667,703 A * | 6/1972 | Boek | B64D 33/02 244/53 B |
| 3,936,017 A * | 2/1976 | Blythe | B64C 25/423 244/110 B |
| 4,371,133 A * | 2/1983 | Edgley | B64C 11/001 244/13 |
| 4,500,055 A * | 2/1985 | Krojer | B64D 27/14 244/55 |
| 4,767,271 A | 8/1988 | Catlow | |
| 4,860,537 A * | 8/1989 | Taylor | F02C 3/067 415/65 |
| 4,976,102 A * | 12/1990 | Taylor | B64C 11/48 416/129 |
| 5,079,916 A * | 1/1992 | Johnson | B64C 11/48 416/129 |
| 5,114,097 A * | 5/1992 | Williams | B64C 1/0009 244/117 R |
| 5,529,263 A * | 6/1996 | Rudolph | B64C 30/00 244/15 |
| 5,855,340 A * | 1/1999 | Bacon | B64D 27/20 244/53 R |
| 5,957,405 A * | 9/1999 | Williams | B64C 1/00 244/15 |
| 6,161,374 A * | 12/2000 | Sverdlin | B63H 21/16 60/39.15 |
| 6,199,795 B1 * | 3/2001 | Williams | B64C 1/00 244/130 |
| 6,575,406 B2 * | 6/2003 | Nelson | B64C 1/0009 244/119 |
| 6,612,522 B1 * | 9/2003 | Aldrin | B64G 1/002 244/159.3 |
| 7,407,133 B2 * | 8/2008 | Bacon | B64D 27/20 244/53 R |
| 7,520,470 B2 * | 4/2009 | Lucchesini | B64C 1/0009 244/199.1 |
| 8,167,239 B2 * | 5/2012 | Guering | B64D 27/02 244/54 |
| 8,196,861 B2 * | 6/2012 | Cazals | B64D 33/02 244/58 |
| 8,262,016 B2 * | 9/2012 | Gosling | B64C 39/024 244/12.2 |
| 2010/0038472 A1 * | 2/2010 | Cazals | B64D 27/20 244/54 |

FOREIGN PATENT DOCUMENTS

| | | | | |
|---|---|---|---|---|
| EP | 0 272 822 A1 | 6/1988 | | |
| FR | 875647 A | * | 9/1942 | ............. B64C 11/00 |
| FR | 1 339 141 A | 10/1963 | | |
| GB | 625 802 A | 7/1949 | | |
| GB | 954365 A | 4/1964 | | |
| JP | S63-25324 A | 2/1988 | | |
| WO | WO 2010/049610 A1 | 5/2010 | | |

OTHER PUBLICATIONS

Written Opinion of the International Searching Authority as issued in International Patent Application No. PCT/FR2013/052583, dated May 12, 2015.

International Search Report as issued in International Patent Application No. PCT/FR2013/052583, dated Jan. 14, 2014.

Notice of Reasons for Rejection as issued in Japanese Patent Application No. 2015-541209, dated Jul. 25, 2017.

* cited by examiner

AIRCRAFT PROPELLED BY A TURBOJET ENGINE WITH CONTRAROTATING FANS

CROSS REFERENCE TO RELATED APPLICATIONS

This application is the U.S. National Stage of PCT/FR2013/052583 filed Oct. 29, 2013, which in turn claims priority to French Application No. 1260597, filed Nov. 8, 2012. The contents of both applications are incorporated herein by reference in their entirety.

BACKGROUND OF THE INVENTION

The present invention relates to the general field of aircraft, and in particular to civil airplanes, which aircraft are propelled by a bypass turbojet incorporated in part in the fuselage of the aircraft.

Civil airplanes are generally fitted with turbojets mounted under the wings or in a rear position on the fuselage, and they are fastened thereto by means of pylons.

Because of the increase in the cost of fuel expected in the years to come, engine manufacturers are seeking to reduce the fuel consumption of civil airplanes. One of the ways envisaged for doing this is to embed the engines at least in part inside the fuselage of an airplane in order to eliminate the pylons and the fairings of the engines, thereby reducing the weight of the propulsion unit and reducing its drag. The sound nuisance from the airplane is also reduced thereby.

Furthermore, in flight, a boundary layer forms around the fuselage of the airplane and generates aerodynamic drag. In the past, although it used to be considered that engines should not ingest this boundary layer in order to avoid high levels of distortion in the fan and high levels of vibration in the shafts of the engines, it is now considered that taking a portion of this boundary layer into the engines makes it possible to reduce the aerodynamic drag of the airplane and to reduce the speed with which air is admitted into the engines, thereby achieving a significant improvement in propulsion efficiency.

Thus, Document WO 2010/049610 describes an airplane architecture having engines with nacelles that are partially embedded in the fuselage of the airplane in order to take in a portion of the boundary layer.

OBJECT AND SUMMARY OF THE INVENTION

An object of the present invention is to propose another aircraft architecture that enables sound nuisance and fuel consumption of the aircraft to be reduced by limiting aerodynamic drag by taking in the boundary layer.

This object is achieved by an aircraft propelled by a turbojet having contrarotating fans, the turbojet being incorporated at the rear of a fuselage of the aircraft and in line therewith and comprising two gas generators that feed a working turbine having two contrarotating turbine rotors for driving two fans arranged downstream from the gas generators, and distinct air intakes for feeding each gas generator, said air intakes being connected to the fuselage of the aircraft so as to take in at least a portion of the boundary layer formed around the fuselage of the aircraft.

The turbojet of the aircraft in accordance with the invention is incorporated in the rear of the fuselage, in line therewith, and without having recourse to a pylon. As a result, the aerodynamic drag induced by the turbojet is reduced. Furthermore, the turbojet ingests a portion of the boundary layer that is formed around the fuselage of the aircraft via air intakes, with the remaining portion of the boundary layer then being ingested by the fans. Since the speed of the boundary layer is low, the admission speed and thus the ejection speed of the gas stream passing through the engine is also low. This results in high propulsion efficiency and low levels of sound nuisance.

Furthermore, the working turbine is fed by two gas generators, Thus, in the event of one of the gas generators failing, the other can continue to perform this function. Likewise, since the fans are arranged in series, if one of them fails, the other fan can take over.

Preferably, the fans present an outside diameter that is substantially identical to the maximum diameter of the fuselage of the aircraft, thereby making it possible to obtain a high bypass ratio for better propulsion efficiency. In addition, the fuselage of the aircraft tends to mask the air intake to the fans, thereby protecting them from ingesting foreign bodies and limiting the noise radiated by the fans.

Also preferably, the gas generators are arranged in primary flow passages forming a V-shape between them. Thus, in the event of a disk of one of the gas generators bursting, no debris will impact against the other gas generator and the fans.

Each of the primary flow passages may lie at an angle in the range 80° to 120° relative to a longitudinal axis of the fuselage of the aircraft. The working turbine and the fans are advantageously centered on a longitudinal axis of the fuselage of the aircraft.

Also preferably, the fans are ducted by a nacelle fastened to a vertical empennage of the aircraft.

BRIEF DESCRIPTION OF THE DRAWING

Other characteristics and advantages of the invention appear from the following description made with reference to the accompanying drawings which show an embodiment having no limiting character. In the figures.

DETAILED DESCRIPTION OF THE INVENTION

Figure 1:
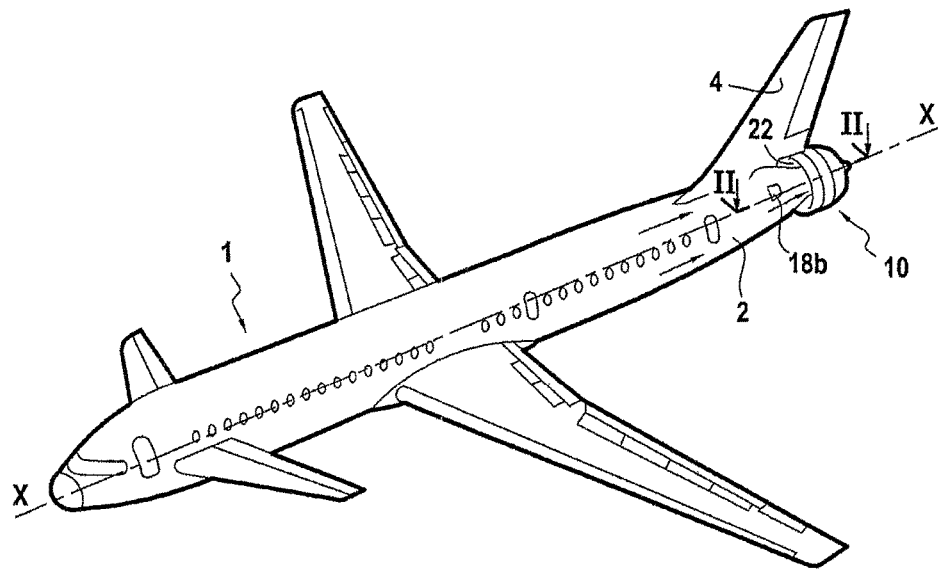
FIG. 1 is a diagrammatic view in perspective of a civil aircraft in accordance with the invention.

The invention relates to any aircraft, whether civil or military, e.g. to drones and to civil airplanes of the kind shown in FIG. 1.

FIG. 1 thus shows a civil airplane 1 in accordance with the invention. The airplane has a turbojet 10 incorporated at the rear of the fuselage 2 of the airplane, in line therewith.

Figure 2:
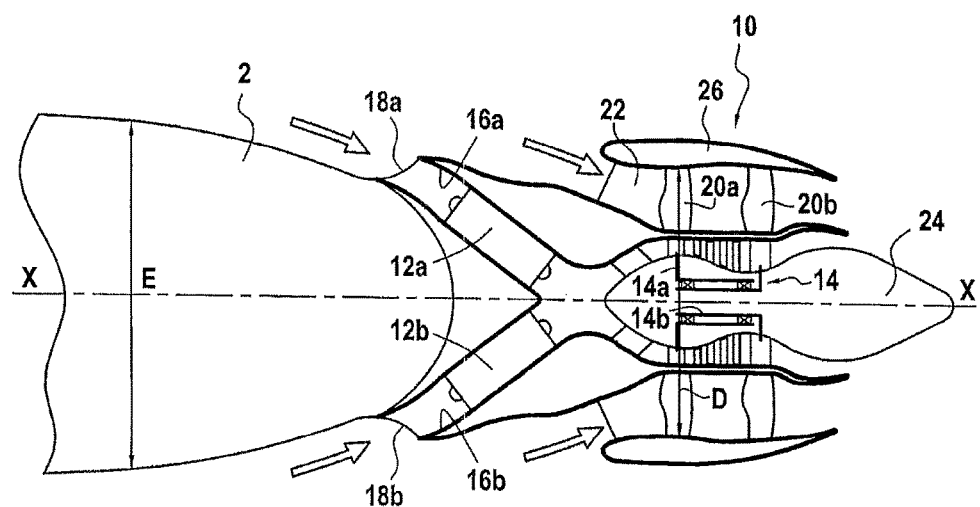
FIG. 2 shows the turbojet of the FIG. 1 aircraft in longitudinal section on II-II.

As shown more clearly in FIG. 2, the turbojet 10 is centered on a longitudinal axis X-X of the fuselage 2 of the airplane. The turbojet comprises in particular, from upstream to downstream in the gas flow direction, two distinct gas generators 12a and 12b that are arranged in parallel and that feed a single working turbine 14.

In known manner, each gas generator 12a, 12b comprises a low pressure compressor, a high pressure compressor, a combustion chamber, a low pressure turbine, and a high pressure turbine (not shown in the figures).

Furthermore, each gas generator 12a, 12b is housed in a respective primary flow passage 16a, 16b. Between them, these two primary flow passages preferably form a V-shape that is open in the upstream direction and that converges on the longitudinal axis X-X.

Also preferably, each of the primary flow passages 16*a* and 16*b* housing a gas generator lies at an angle in the range 80° to 120° relative to a longitudinal axis of the fuselage of the airplane.

A mixer (not shown in the figures) is positioned in the zone of convergence of the two primary flow passages 16*a* and 16*b*. The function of this mixer is to mix the gas streams coming from the two gas generators so as to create a single uniform gas stream that is to feed the working turbine 14.

Distinct air intakes 18*a* and 18*b* for feeding each of the gas generators are also provided. These air intakes are connected to the fuselage 2 of the airplane so as to take in at least a portion of the boundary layer formed around the fuselage of the airplane. More precisely, their inside walls are directly incorporated in the fuselage of the airplane.

The working turbine 14 that is fed by the two gas generators has two contrarotating turbine rotors 14*a* and 14*b* for driving contrarotating rotation of two fans 20*a* and 20*b* that are located behind the turbojet and that are arranged in series in a secondary flow passage 22. These turbine rotors are coaxial and centered on the longitudinal axis X-X. The working turbine 14 is housed inside a structure (not shown in the figures) that is situated inside the fuselage, the fuselage also supporting an annular central body 24 centered on the longitudinal axis X-X.

The two fans 20*a* and 20*b* are ducted by a nacelle 26 that is fastened directly to the vertical empennage 4 of the airplane. These fans present an outside diameter D that corresponds substantially to the maximum diameter E of the fuselage 2 of the airplane.

The rear position of the fans and their large outside diameter thus enables them to be fed with air by the portion of the boundary layer that has not been taken into the gas generators.

As a result, since the flow speed of the boundary layer is relatively low, the speed of rotation of the fans also remains relatively low, thereby making it possible to increase the propulsion efficiency of the turbojet and to reduce its sound emissions.

Furthermore, since the boundary layer is sucked in (by the gas generators and by the fans of the turbojet), and since the front sectional area of the airplane is small (the turbojet is hidden behind the fuselage of the airplane), the aerodynamic drag of the airplane is limited.

It should be observed that the equipment associated with the turbojet (not shown in the figures) may be arranged around the gas generators where there is available space.

It should also be observed that the main problems of turbojet failure can be avoided. In particular, in the event of one gas generator failing, the other gas generator can continue to feed the working turbine in order to produce the necessary thrust. Likewise, in the event of a disk of a gas generator bursting, the V-shaped arrangement of the gas generators makes it possible to avoid debris impacting against the other gas generator or against one of the fans.

The invention claimed is:

1. An aircraft propelled by a turbojet having two contrarotating fans, the turbojet being incorporated at the rear of a fuselage of the aircraft and in line with the fuselage and comprising two gas generators that feed a single working turbine having two contrarotating turbine rotors for driving the two contrarotating fans, the two contrarotating fans being arranged downstream from the two gas generators, and distinct air intakes for feeding each gas generator, said air intakes being connected to the fuselage of the aircraft, wherein the turbojet further comprises a mixer disposed in a zone of convergence of two primary flow passages, said mixer being disposed upstream from the two contrarotating fans and along an axis of the single working turbine and being configured and arranged to mix gas streams from an output end of the two primary flow passages and coming from the two gas generators, to create a single uniform gas stream to feed the single working turbine, the two gas generators further being disposed in the two primary flow passages and forming a V-shape between them wherein each of the two primary flow passages and each of the corresponding gas generator lies at an angle in the range 80° to 120° relative to a longitudinal axis of the fuselage of the aircraft and wherein the two contrarotating fans are ducted by a nacelle fastened to a vertical empennage of the aircraft and wherein the nacelle comprises a secondary flow passage disposed radially outward of the zone of convergence of the primary flow passages and rearward of the air intakes and configured and arranged to feed air from a portion of the boundary layer not taken into the two gas generators to the two contrarotating fans in a region radially outward of the single working turbine.

2. An aircraft according to claim 1, wherein the two contrarotating fans present an outside diameter that is substantially identical to the maximum diameter of the fuselage of the aircraft.

3. An aircraft according to claim 1, wherein the working turbine and the two contrarotating fans are centered on the longitudinal axis of the fuselage of the aircraft.

4. An aircraft according to claim 1, wherein all of the output of the two gas generators is directed to the mixer.

5. An aircraft according to claim 1, wherein the angle is selected to, in the event of a failure of a disk of one of the two gas generators, avoid debris impacting against the other of the two gas generators or against one of the two contrarotating fans.

* * * * *